United States Patent
Abraham et al.

(10) Patent No.: US 9,645,260 B2
(45) Date of Patent: May 9, 2017

(54) PHOTON COUNTING SYSTEM AND METHOD

(71) Applicant: Analogic Corporation, Peabody, MA (US)

(72) Inventors: Doug Q. Abraham, Topsfield, MA (US); Basak Ulker Karbeyaz, Concord, MA (US); David Rozas, Brighton, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 156 days.

(21) Appl. No.: 14/601,580

(22) Filed: Jan. 21, 2015

(65) Prior Publication Data
US 2016/0209520 A1  Jul. 21, 2016

(51) Int. Cl.
*G01T 1/24* (2006.01)
*G01T 1/17* (2006.01)

(52) U.S. Cl.
CPC ............. *G01T 1/247* (2013.01); *G01T 1/171* (2013.01)

(58) Field of Classification Search
CPC .. G01T 1/16; G01T 1/161; G01T 1/17; G01T 1/171; G01T 1/24; G01T 1/247; G01T 1/29; G01T 1/2985; G01T 1/371; G01T 1/64; H04N 5/3205; H04N 5/321; H04N 5/325; H04N 5/3025
See application file for complete search history.

(56) References Cited

U.S. PATENT DOCUMENTS

| | | | | |
|---|---|---|---|---|
| 7,208,739 B1* | 4/2007 | Yanoff | .................... | G01T 1/171 250/363.09 |
| 8,921,796 B1* | 12/2014 | Arseneau | ............. | G01T 1/2985 250/362 |
| 2007/0003006 A1* | 1/2007 | Tkaczyk | ............... | G01T 1/2985 378/19 |
| 2011/0036989 A1* | 2/2011 | Marks | ...................... | G01T 1/17 250/370.08 |
| 2011/0155899 A1* | 6/2011 | Dror | ....................... | G01T 1/171 250/252.1 |
| 2014/0191136 A1* | 7/2014 | Loeliger | ................. | G01T 1/171 250/394 |
| 2014/0314211 A1* | 10/2014 | Zou | ........................ | G01T 1/171 378/207 |

* cited by examiner

*Primary Examiner* — David E Smith
(74) *Attorney, Agent, or Firm* — Cooper Legal Group, LLC

(57) ABSTRACT

Among other things, one or more techniques and/or systems for counting detection events via a photon counting detector array is provided. A first instance where an amplitude of an electrical signal exceeds an event threshold is detected. The first instance is generated responsive to a first detection event at a detector cell. An event counter is disabled from counting other detection events at the detector cell for a first blocking interval. At a conclusion of the first blocking interval, the amplitude of the electrical signal is determined. Responsive to determining that the amplitude of the electrical signal is below the event threshold, an adjustment is made to an event count based upon the first detection event. Responsive to determining that the amplitude of the electrical signal exceeds the event threshold, the event counter is disabled from counting other detection events at the detector cell for a second blocking interval.

20 Claims, 6 Drawing Sheets

PHOTON COUNTING SYSTEM AND METHOD

BACKGROUND

The present application relates to the field of radiation imaging. It finds particular application to imaging systems that use photon counting detector arrays to determine detection events and pulse pileups.

Today, imaging systems that use radiation to image an article, such as computed tomography (CT) systems, single-photon emission computed tomography (SPECT) systems, digital projection systems, and/or line-scan systems, for example, are useful to provide information, or images, of interior aspects of an article under examination. Generally, the article is exposed to radiation comprising photons (e.g., x-rays, gamma rays, etc.), and an image(s) is formed based upon the radiation absorbed and/or attenuated by interior aspects of the article, or rather an amount of radiation photons that is able to pass through the article. Generally, highly dense aspects of the article absorb and/or attenuate more radiation than less dense aspects, and thus an aspect having a higher density, such as a bone or metal, for example, may be apparent when surrounded by less dense aspects, such as muscle or clothing.

Imaging systems typically comprise a detector array having one or more detector cells. Respective detector cells are configured to indirectly or directly convert radiation photons impingent thereon into electrical charge which is used to generate an electrical signal. The detector cells are typically "energy integrating" or "photon counting" type detector cells (e.g., the imaging system operates in energy integrating mode or photon counting mode).

Energy integrating detector cells are configured to integrate the electrical charge generated over a period of time (e.g., at times referred to as a measurement interval or view) to generate a signal that is proportional to an incoming radiation photon flux rate at a detector cell. While energy integrating detector cells are widely used, there are several drawbacks to this type of cell. For example, energy integrating detectors cells are generally not able to provide feedback as to the number and/or energy of radiation photons detected. As another drawback, there is a lower limit of detection defined by noise such that a detector cell with little to no incident radiation may produce some signal due to thermal and/or analog read noise (e.g., produced by a radiation detection element and/or electronics arrangement of the detector cell). It may be appreciated that as a result of this lower limit, the dose of radiation that is applied to an object under examination is generally greater than the dose of radiation that may be applied to the object if the detector cells are of a photon counting type.

Photon counting type detector cells are configured to output a signal (e.g., a pulse) for respective detected radiation photons (e.g., where the detection of a radiation photon may be referred to as a detection event). In some embodiments, the signal (e.g., or an amplitude of the pulse) is indicative of a radiation energy of the detected radiation photon. A controller is configured to determine the location and energy of respective detected radiation photons based upon the pulse, accumulate the detection events occurring during a measurement interval, digitize the information, and/or process the digital information to form an image, for example.

One drawback of photon counting type detector cells relates to a phenomenon known as pulse pileup. Pulse pileup occurs when two or more photons strike a detector cell in close temporal proximity, causing the pulse of the first photon strike to be combined with the pulse of a second photon strike because the first pulse does not have time to decay before the second photon strike. Thus, a pulse generated from the second photon strike effectively extends the first pulse. Because the pulse of the second photon strike is combined with the pulse of the first photon strike, the system may mistake the detection event as a single photon strike while not recognizing the second photon strike, for example.

SUMMARY

Aspects of the present application address the above matters, and others. According to one aspect, a method for counting detection events via a photon counting detector array is provided. The method comprises detecting a first instance where an amplitude of an electrical signal exceeds an event threshold. The first instance is generated responsive to a first detection event at a detector cell of the photon counting detector array. The method also comprises, responsive to the detecting, disabling an event counter from counting other detection events at the detector cell for a first blocking interval. The method comprises, at a conclusion of the first blocking interval, determining whether the amplitude of the electrical signal is below the event threshold. The method further comprises, responsive to determining that the amplitude of the electrical signal is below the event threshold at the conclusion of the first blocking interval, making an adjustment to an event count at the event counter based upon the first detection event. The method also comprises, responsive to determining that the amplitude of the electrical signal exceeds the event threshold at the conclusion of the first blocking interval, disabling the event counter from counting other detection events at the detector cell for a second blocking interval.

According to another aspect, a method for counting detection events via a photon counting detector array is provided. The method comprises detecting a first instance where an amplitude of an electrical signal exceeds an event threshold. The first instance is generated responsive to a first detection event at a detector cell of the photon counting detector array. The method also comprises, responsive to the detecting, disabling an event counter from counting other detection events at the detector cell for a first blocking interval. The method further comprises, at a conclusion of the first blocking interval, determining whether the amplitude of the electrical signal is below the event threshold. The method also comprises, responsive to determining that the amplitude of the electrical signal is below the event threshold at the conclusion of the first blocking interval, enabling the event counter and making an adjustment to an event count at the event counter based upon the first detection event. The method also comprises, after enabling the event counter, detecting a second instance where the amplitude of the electrical signal exceeds the event threshold, the second instance generated responsive to a second detection event at the detector cell.

According to yet another aspect, an imaging system is provided. The imaging system comprises a radiation source configured to expose an article to radiation and a photon counting detector array comprising a detector cell configured to detect at least some of the radiation. The imaging system also comprises timing logic configured to count detection events via the photon counting detector array. The timing logic is configured to detect a first instance where an amplitude of an electrical signal exceeds an event threshold. The first instance is generated responsive to a first detection event at the detector cell. The timing logic is configured to disable an event counter from counting other detection events at the detector cell for a first blocking interval responsive to detecting the first instance. The timing logic is configured to determine whether the amplitude of the electrical signal is below the event threshold at a conclusion of the first blocking interval. The timing logic is configured to adjust an event count at the event counter based upon the first detection event responsive to determining that the amplitude of the electrical signal is below the event threshold at the conclusion of the first blocking interval. The timing logic is configured to disable the event counter from counting other detection events at the detector cell for a second blocking interval responsive to determining that the amplitude of the electrical signal exceeds the event threshold at the conclusion of the first blocking interval.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which.

DESCRIPTION

Figure 1:
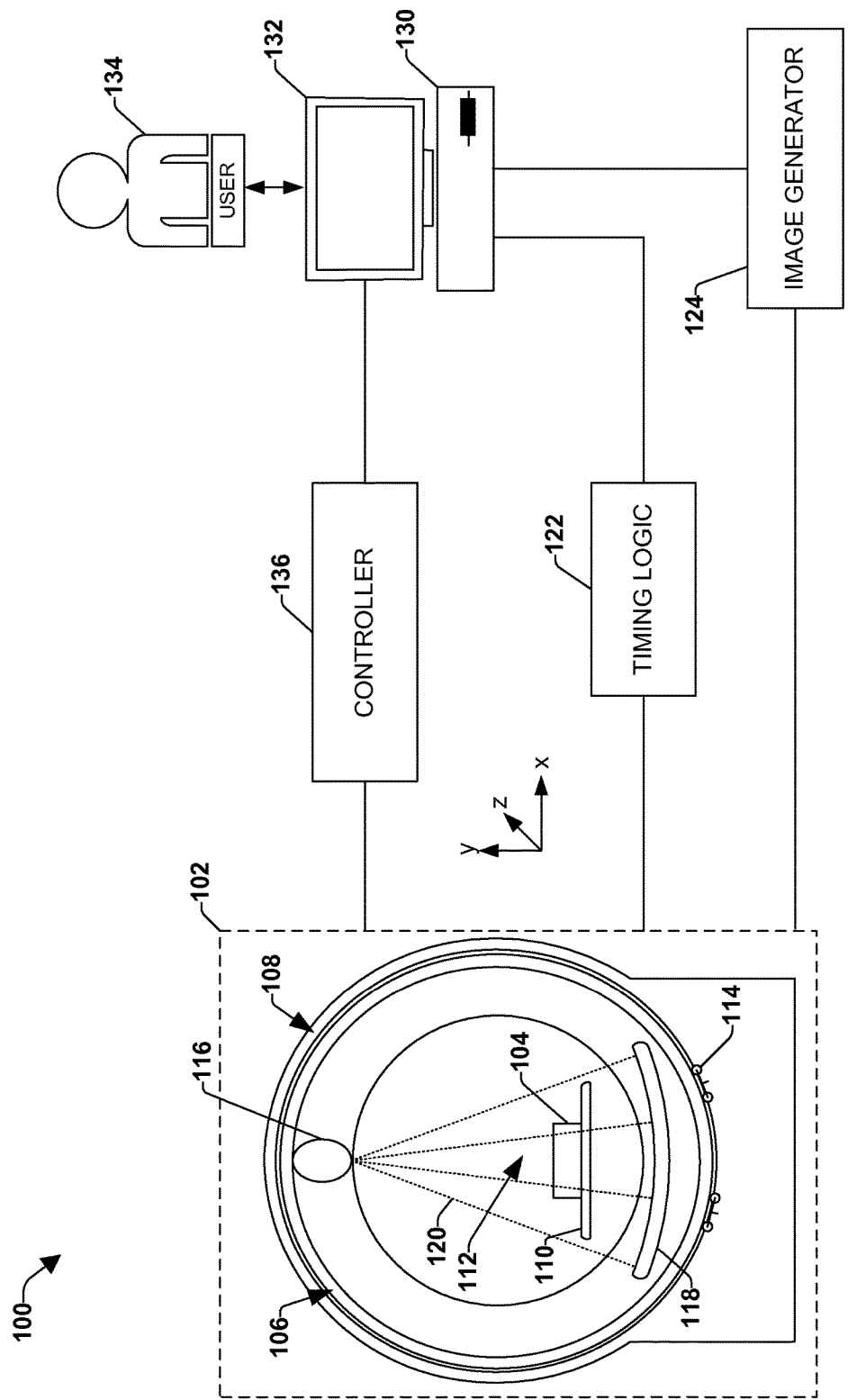
FIG. 1 illustrates an example environment of an imaging system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and/or techniques are described herein for detecting when pulse pileup occurs and/or for correcting for such pulse pileup. When a detection event occurs (e.g., a radiation photon impinges a detector cell of the detector array and is converted to electrical charge), the electrical charge creates a pulse in an electrical signal corresponding to the detector cell in which the detection event occurred. The amplitude of the electrical signal is compared to an event threshold. The phrase "amplitude of an electrical signal" is used generically herein to refer to a voltage amplitude of a voltage signal and/or a current amplitude of a current signal.

Timing logic may specify how a result of the comparison is to be treated. For example, when the amplitude of the electrical signal exceeds the event threshold (e.g., due to the pulse yielded from the detection event), timing logic may specify that a controller is to disable an event counter for a defined interval of time (e.g., referred to herein as a blocking interval). Thus, additional pulses in the electrical signal due to additional detection events may be ignored during the blocking interval. At a conclusion of the blocking interval, timing logic may specify that the controller is to determine whether the amplitude of the electrical signal exceeds (e.g., continues to exceed) the event threshold. If the amplitude of the electrical signal does not exceed the event threshold at the conclusion of the blocking interval, the timing logic may specify that the controller is to adjust (e.g., increment) an event counter to count the detection event which triggered the blocking interval. If the amplitude of the electrical signal exceeds the event threshold at the conclusion of the blocking interval, the timing logic may specify that the controller is to adjust (e.g., increment) a pileup counter which maintains a pileup count of possible instances of pulse pileup at the detector cell. In some embodiments, a tally on the pileup counter is used to adjust an event count of the event counter to generate a total count which takes into consideration pulse pileup.

FIG. 1 illustrates an imaging system 100 configured to use radiation (e.g., ionizing radiation) to image an article 104. In the illustrated embodiment, the imaging system 100 is a computed tomography (CT) system, although the systems and/or techniques described herein may find applicability to other imaging systems such as line-scan systems, mammography systems, and/or diffraction systems, for example. Moreover, it may be appreciated that the arrangement of features, inclusion of features and/or exclusion of other features from the example imaging system 100 is not intended to be interpreted in a limiting manner, such as necessarily specifying the location, inclusion, and/or relative position of the features.

The example imaging system 100 comprises an examination unit 102 configured to examine the article 104. The examination unit 102 comprises a rotating gantry 106 and a (e.g., stationary) support structure 108 (e.g., which may encase and/or surround at least a portion of the rotating gantry 106 (e.g., as illustrated with an outer, stationary ring, surrounding an outside edge of an inner, rotating ring)). The examination unit 102 also comprises a support article 110, such as a bed or conveyor belt, configured to support the article 104 during an examination. In some embodiments, the support article 110 may be configured to translate the article 104 into and/or through an examination region 112 (e.g., a hollow bore in the rotating gantry 106), where the article 104 is exposed to radiation 120, during the examination. The article 104 may be an animal, human, or inanimate article (e.g., baggage).

The rotating gantry 106 may surround a portion of the examination region 112 and may comprise a radiation source 116 (e.g., an ionizing radiation source such as an x-ray source or gamma-ray source) and a detector array 118. The detector array 118 is typically mounted on a substantially diametrically opposite side of the rotating gantry 106 relative to the radiation source 116, and during an examination of the article 104, the rotating gantry 106 (e.g., comprising the radiation source 116 and detector array 118) is rotated about the article 104 by a rotator 114 (e.g., belt, drive shaft, chain, roller truck, etc.). Because the radiation source 116 and the detector array 118 are mounted to the rotating gantry 106, a relative position between the detector array 118 and the radiation source 116 is substantially maintained during the rotation of the rotating gantry 106.

During the examination of the article 104, the radiation source 116 emits cone-beam and/or fan-beam radiation 120 from a focal spot of the radiation source 116 (e.g., a region within the radiation source 116 from which the radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multi-energy spectrums depending upon, among other things, whether the imaging system 100 is configured as a single-energy system or a multi-energy (e.g., dual-energy) system.

As the emitted radiation 120 traverses the article 104, the radiation 120 may be attenuated (e.g., absorbed and/or scattered) differently by different aspects of the article. Because different aspects attenuate different percentages of the radiation 120, the number of photons detected by respective detector cells of the detector array 118 may vary. For example, detector cells that are shadowed by dense aspects of the article 104, such as a bone or metal plate, may detect fewer radiation photons (e.g., or a ratio between high energy radiation photons and low energy radiation photons may be higher) than detector cells that are shadowed by lower density aspects of the article 104, such as skin or clothing (e.g., which may allow an overall greater number of radiation photons to pass through and/or may allow a greater number of low energy radiation photons to pass through).

Respective detector cells of the detector array 118 are configured to count photons (e.g., respective detector cells are a photon counting type detector cell) and may comprise a radiation detection element and an electronics arrangement (e.g., including a digital acquisition system (DAS) and/or coupled to the DAS). The radiation detection element is configured to convert radiation photons into electrical charge and the electronics arrangement is configured to generate an electrical signal based upon the detection events and/or to determine a number of photons detected based upon the electrical signal.

The radiation detection element of respective detector cells comprises a conversation material configured to convert the radiation photons into electrical charge. In some embodiments, the radiation photons are directly converted into electrical charge. In other embodiments, the radiation photons are indirectly converted into electrical charge (e.g., such as by converting the radiation photons into light photons and converting the light photons into electrical charge).

The electronics arrangement of respective detector cells is configured to convert the electrical charge into an electrical signal and/or process the electrical signal (e.g., via readout circuitry). Such processing may comprise counting, filtering, shaping, and/or measuring the electrical signal to generate useful information regarding respective detection events on a detector cell, such as a number of detection events counted by respective detector cells. As will be further described with respect to FIGS. 2-3, a timing logic component 122 is configured to provide the electronics arrangement with timing logic for counting detection events and/or logic for identifying pulse pileup, which may be used to correct a number of detection events counted and/or to otherwise account for pulse pileup.

Information generated and/or compiled by the electronics arrangement (e.g., such as a number of detection events detected by the detector cells and/or a number of pileup events detected by the detector cell according to the timing logic) may be transmitted to an image generator 124 configured to generate an image(s) of the article 104 using the information. Such images may depict a two dimensional representation of the article 104 and/or a three dimensional representation of the article 104. In other embodiments, the information may be transmitted to other digital processing components, such as a threat analysis component, for processing.

The example imaging system 100 also comprises the terminal 130, or workstation (e.g., a computer), configured to receive image(s) from the image generator 124, which can be displayed on a monitor 132 to a user 134 (e.g., security personnel, medical personnel, etc.). In this way, the user 134 can inspect the image(s) to identify areas of interest within the article (s) 104. The terminal 130 can also be configured to receive user input which can direct operations of the examination unit 102 (e.g., a speed of gantry rotation, an energy level of the radiation, an imaging mode, etc.).

In the example imaging system 100, a controller 136 is operably coupled to the terminal 130. The controller 136 may be configured to control operations of the examination unit 102, for example. By way of example, in some embodiments, the controller 136 may be configured to receive information from the terminal 130 and to issue instructions to the examination unit 102 indicative of the received information (e.g., adjust a speed of a conveyor belt, adjust a voltage applied to the radiation source 116, etc.).

Figure 2:
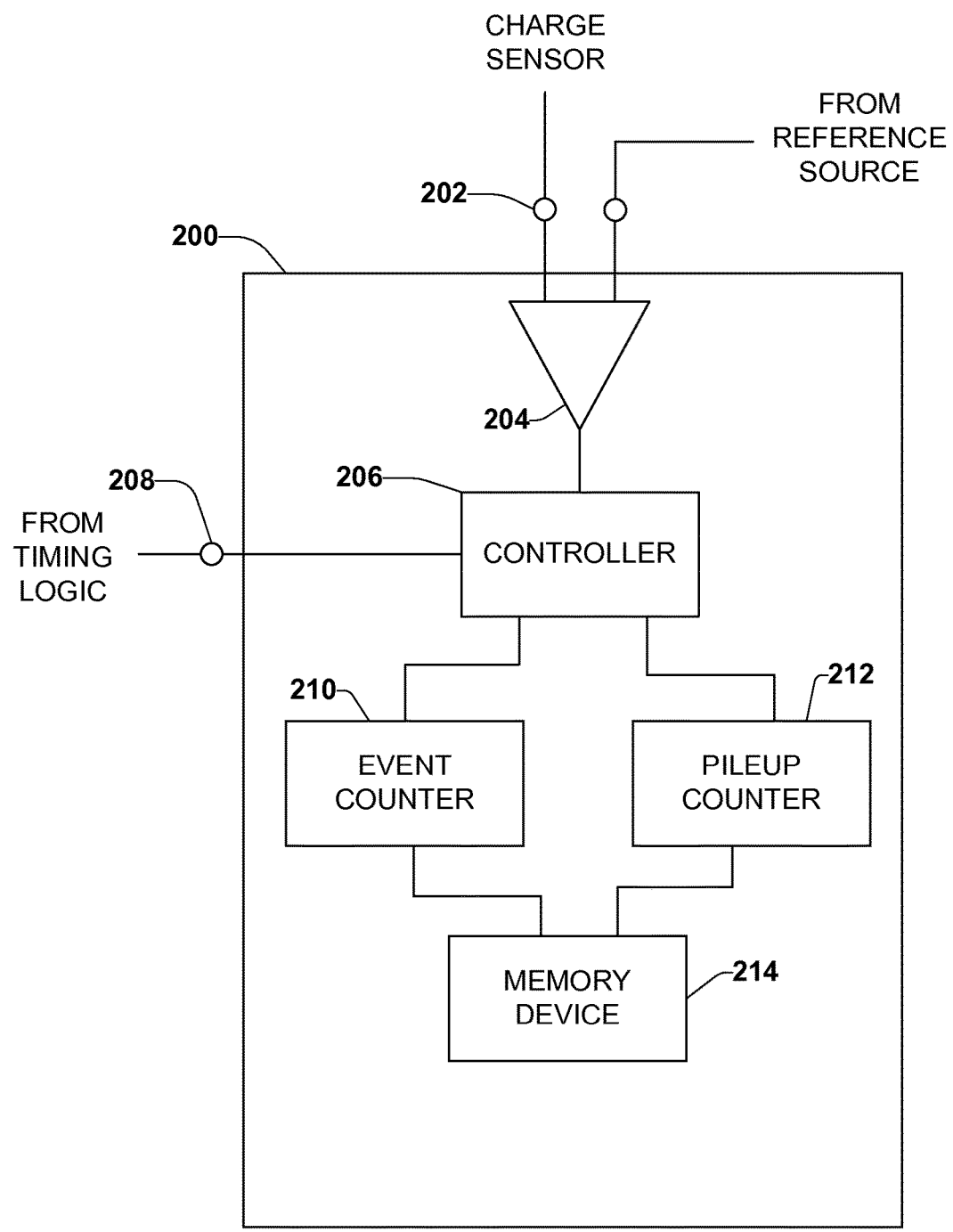
FIG. 2 illustrates a schematic diagram of an electronics arrangement.

Referring to FIG. 2, a schematic diagram of an example electronics arrangement 200 (e.g., data acquisition system (DAS)) of a detector cell of a photon counting detector array 118 is illustrated. When a radiation photon impinges a detector cell of the detector array 118 (e.g., when a detection event occurs), charge is generated within the detector cell. The charge collects at a charge sensor, and an electrical pulse is generated by the charge sensor based upon the amount of charge collected over a sampling interval. The electrical pulse travels through a channel and enters the electronics arrangement 200 at a terminal 202. In some embodiments, an amplitude of the electrical pulse is a function of the amount of charge detected during the sampling interval and is typically indicative of an energy level of the impinging radiation photon.

The electronics arrangement 200 is configured to measure the amplitude of an electrical pulse to determine when a detection event occurred and/or to determine an energy spectrum associated with the detection event. The electronics arrangement 200 comprises a comparator 204 comprising two input nodes. A first input node of the comparator 204 is coupled to the terminal 202. A second input node of the comparator 204 is coupled to a reference source configured to generate a reference signal. The comparator 204 is configured to compare the amplitude of the electrical pulse transmitted through the terminal 202 to the amplitude of the reference signal (e.g., a reference voltage or reference current) and to generate an output indicative of a result of the comparison. By way of example, the comparator 204 can compare the amplitude of the electrical pulse to a reference amplitude corresponding to an event threshold and generate an output indicative of a result of the comparison. In some embodiments, the event threshold corresponds to a minimum amplitude that would be produced from a detection event. Thus, when an amplitude of the electrical pulse exceeds the reference amplitude (e.g., because the electrical pulse is the result of a detection event), a first output may be generated. When the amplitude of the electrical pulse does not exceed the reference amplitude (e.g., because the electrical pulse is merely the result of noise detected by the channel and not the result of a detection event), a second output may be generated.

In some embodiments, the electronics arrangement 200 may comprise a plurality of comparators coupled to the terminal 202, and respective comparators may receive a different reference amplitude. In such embodiments, a first comparator may be used to detect electrical pulses having an amplitude that exceeds a first threshold and a second comparator may be used to detect electrical pulses having an amplitude that exceeds a second threshold to facilitate energy discrimination between detection events, for example.

The output of the comparator 204 is provided to a controller 206 that is coupled to the comparator 204. The controller 206 is configured to control operations of an event counter 210 coupled to the controller 206 and/or a pileup counter 212 coupled to the controller 206. By way of example, the controller 206 can receive the output of the comparator 204 and can receive timing logic from the timing logic component 122 via a second terminal 208. Based upon the output of the comparator 204 and the timing logic, the controller 206 can generate instructions related to adjusting counts, enabling and/or disabling an event counter 210, enabling and/or disabling a pileup counter 212, etc.

The event counter 210 is configured to tabulate and/or record at least some of the results of the comparisons by the comparator 204. For example, as will be described with respect to FIG. 3, when a detection event is identified by the comparator 204 and the controller 206 can verify that an electrical pulse corresponding to the detection event is not indicative of pulse pileup, an event count at the event counter 210 can be adjusted by the controller 206. The adjustment may comprise incrementing or decrementing the event count, and the number of detection events occurring within respective views, as reflected by the event count, can be stored in memory of a memory device 214 coupled to the event counter 210.

As will be described in more detail below, the controller 206 can verify that an electrical pulse is not indicative of pulse pileup by determining if an output of the comparator flips by the conclusion of a defined time interval, referred to herein as a blocking interval. The blocking interval is set to exceed an interval of time in which an amplitude of an electrical pulse would remain above the reference amplitude if the electrical pulse is indicative of a single detection event, for example. If the comparator flips (e.g., indicating that reference amplitude exceeds an amplitude of the electrical pulse at the end of the blocking interval), the controller 206 determines that the electrical pulse is not indicative of pulse pileup. If, at the end of the blocking interval, the output of the comparator 204 indicates that the amplitude of the electrical pulse exceeds the reference amplitude, the controller 206 determines that the electrical pulse may be indicative of pulse pileup.

The pileup counter 212 is configured to tabulate and/or record at least some of the results of the comparisons by the comparator 204. For example, as will be described with respect to FIG. 3, the pileup counter 212 is configured to determine a number of instances, during respective views, in which pulse pileup occurred. For example, when an electrical pulse is above the event threshold at a conclusion of the blocking interval (e.g., and thus it cannot be verified that the electrical pulse is indicative of merely a single detection event), the pileup counter 212 is adjusted by the controller 206 because the electrical pulse may be indicative of multiple detection events. The number of instances in which pulse pileup may have occurred during a view, as reflected by the pileup count, can be stored in memory of a memory device 214 coupled to the event counter 210.

In some embodiments, the number of detection events occurring within a view, as counted by the event counter 210, and the number of pulse pileup events that potentially occurred within the view, as counted by the pileup counter 212, may be used to determine a total count for the detector cell for the view. In some embodiments, this total count is used by the image generator 124 when generating an image using information acquired during the view.

Figure 3:
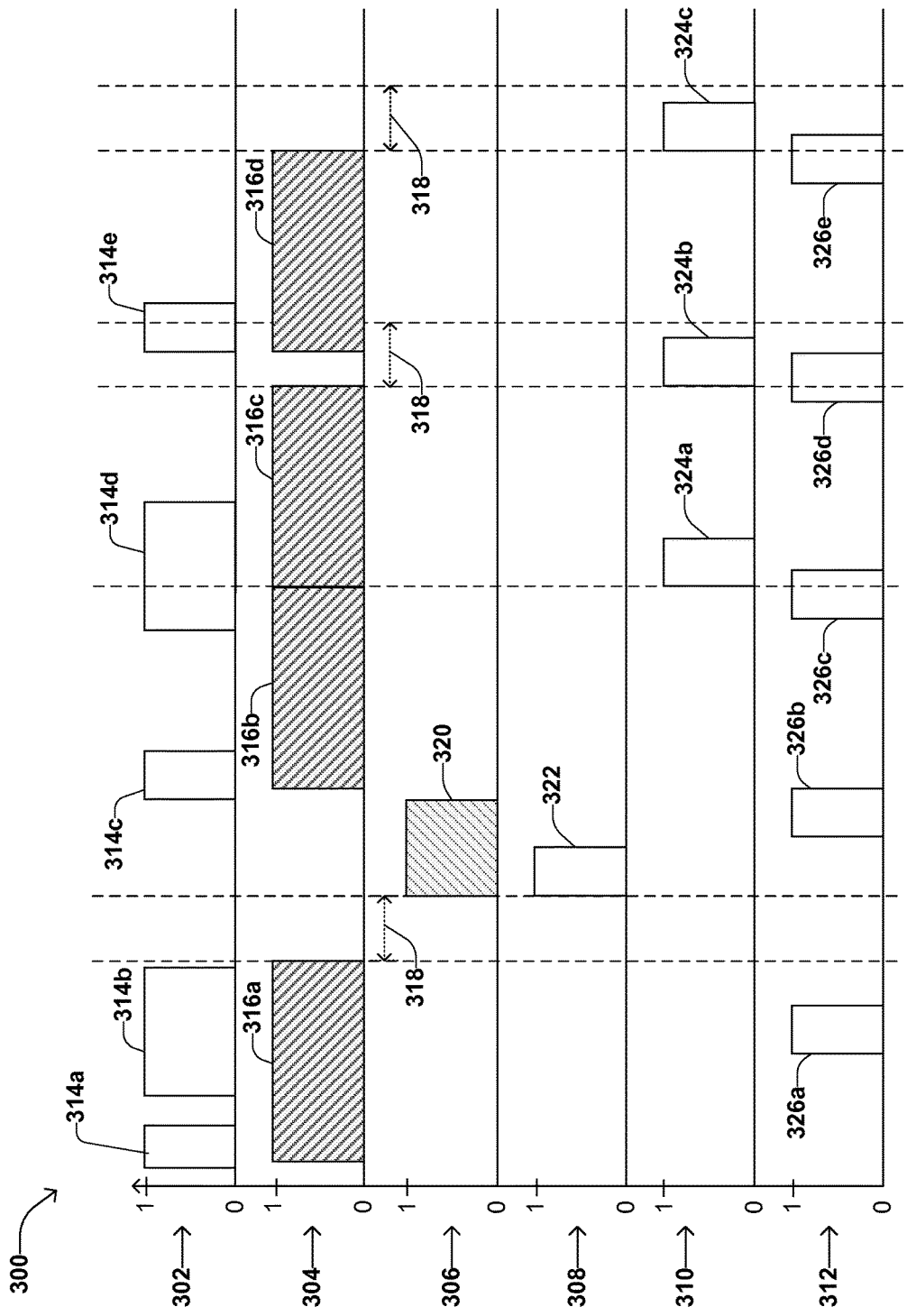
FIG. 3 illustrates an example of timing diagram for timing logic of an imaging system.

Referring to FIG. 3, an example timing diagram 300 in accordance with some embodiments is provided. The timing diagram 300 describes how timing logic, stored at the timing logic component 122 and/or at the controller 206, for example, may be used by the controller 206 to control event counting by the event counter 210 and/or to control pileup counting by the pileup counter 212.

The timing diagram 300 comprises an event detection waveform 302 (e.g., output by the comparator 204). The event detection waveform 302 corresponds to a second logic state (e.g., logic high or "1") when the amplitude of an electrical signal through the terminal 202 exceeds an event threshold (e.g., thus indicating that one or more detection events has occurred). The event detection waveform 302 corresponds to a first logic state (e.g., logic low or "0") when the amplitude of the electrical signal is below the event threshold. In this example, a first instance of the electrical signal exceeding the event threshold is generated at 314a responsive to a first detection event at the detector cell of the detector array 118. The first instance may correspond to a first pulse in the electrical signal.

The timing logic provides that responsive to the event detection waveform 302 transitioning from the first logic state to the second logic state (e.g., responsive to the event detection waveform 302 going high), a blocking interval is enabled. Thus, as illustrated by the timing diagram 300, a blocking waveform 304 transitions from a first logic state (e.g., logic low) to a second logic state (e.g., logic high). In the illustrated embodiment, the blocking interval is disabled when the blocking waveform 304 has the first logic state and is enabled when the blocking waveform 304 has the second logic state, such as at 316a, 316b, etc.

The controller 206 is configured to disable the event counter 210 while the blocking interval is enabled. The event counter 210 does not count pulses while the event counter 210 is disabled (e.g., and while the blocking interval is enabled). Thus, instances when the event detection waveform transitions from the first logic state to the second logic state are not counted (e.g., because these transitions are likely to correspond to the same detection event and the drop in the event detection waveform 302 between 314a and 314b is likely due to noise, for example). By way of example, the second instance of the event detection waveform 302 going to the second logic state at 314b is not counted by the event counter 210 due to the second instance occurring while the blocking interval is enabled.

In some embodiments, the temporal length of the blocking interval is set to exceed a length of time in which an amplitude of an electrical pulse would remain above the event threshold if the electrical pulse was indicative of a single detection event. The temporal length may depend upon, among other things, the event threshold (e.g., the selected reference amplitude), an energy spectrum of emitted radiation, and/or a physical structure of the detector cell, such as a thickness of the conversion material and/or the type of conversion material used, for example.

At a conclusion of the first blocking interval, the timing logic provides that the controller 206 is configured to determine whether the amplitude of the electrical signal is below the event threshold during a check interval 318 (e.g., and thus whether the event detection waveform 302 is at a first logic state).

When the amplitude of the electrical signal remains below the event threshold for the check interval 318, the event counter 210 is enabled by the controller 206 and the event counter 210 is adjusted (e.g., incremented or decremented) as illustrated in the timing diagram 300 by an event count waveform 308 transitioning from a first logic state to a second logic state (e.g., going High). It may be appreciated that when the amplitude of the electrical signal remains below the event threshold for the check interval 318, there may be a high probability that the detection event that triggered the first instance of the blocking interval at 316a was the only detection event that occurred during the blocking interval. Further, when the amplitude of the electrical signal remains below the event threshold for the check interval 318, the controller 206 may determine that the detector cell has a clear condition and is therefore prepared to restart the process upon detection of the event detection waveform 302 going to the second logic state (e.g., as shown at 314c). The clear condition is represented by a clear output waveform 306, which transitions from a first logic state (e.g., logic low) to a second logic state (e.g., logic high) when the detector cell has a clear condition, such as at 320.

When the amplitude of the electrical signal is above the event threshold at the beginning of the check interval 322, such as occurs at 314d, and/or goes above the event threshold during the check interval 322, such as occurs at 314e, the timing logic provides that the controller 206 is configured to re-enable the block interval, as shown at 316c and 316d. If the amplitude of the electrical signal is above the event threshold at the beginning of the check interval as shown at 314d, a second detection event (e.g., and possibly more detection events) likely occurred during a blocking interval, such as during the second block interval at 316b. If the amplitude of the electrical signal goes above the event threshold during the check interval as shown at 314e, the controller 206 may not be able to determine if the amplitude of the electrical signal was below the event threshold at the beginning of the check interval 318 due to noise or because merely one detection event occurred at the blocking interval. Thus, in some embodiments, the controller 206 errs on the side of pulse pileup and treats the pulse as being representative of pulse pileup When the controller 206 re-enables the block interval before the check interval 318 has concluded (e.g., and thus without determining that the detector cell has returned to a clear condition), the timing logic provides that the controller 206 is to adjust (e.g., increment or decrement) a pileup count of a pileup counter 212 as illustrated in the timing diagram 300 by a pileup count waveform 310 transitioning from a first logic state to a second logic state (e.g., going high) at 324a. The timing logic also provides that the controller 206 is to adjust the pileup counter 212 at a conclusion of respective blocking intervals if multiple blocking intervals occur within a check interval, as shown at 324b and 324c.

In some embodiments, the timing logic provides that the controller 206 is configured to determine a ratio between a number of instances in which the pileup counter 212 was adjusted, as evident from the pileup count waveform 310 and a possible number of pileup events during a view, as represented by a pileup interval waveform 312 (e.g., where the possible number of pileup events are represented by the ticks 326 in the pileup interval waveform 312). For example, if the timing diagram 300 represents a single view, the ratio would be 3:5. In some embodiments, using the event count for a view and the ratio between a number of instances in which the pileup counter 212 was adjusted and a possible number of pileup events during the view, a total count may be determined for the view. In some embodiments, the total count may be used by the image generator 124 to generate an image(s)

Figure 4:
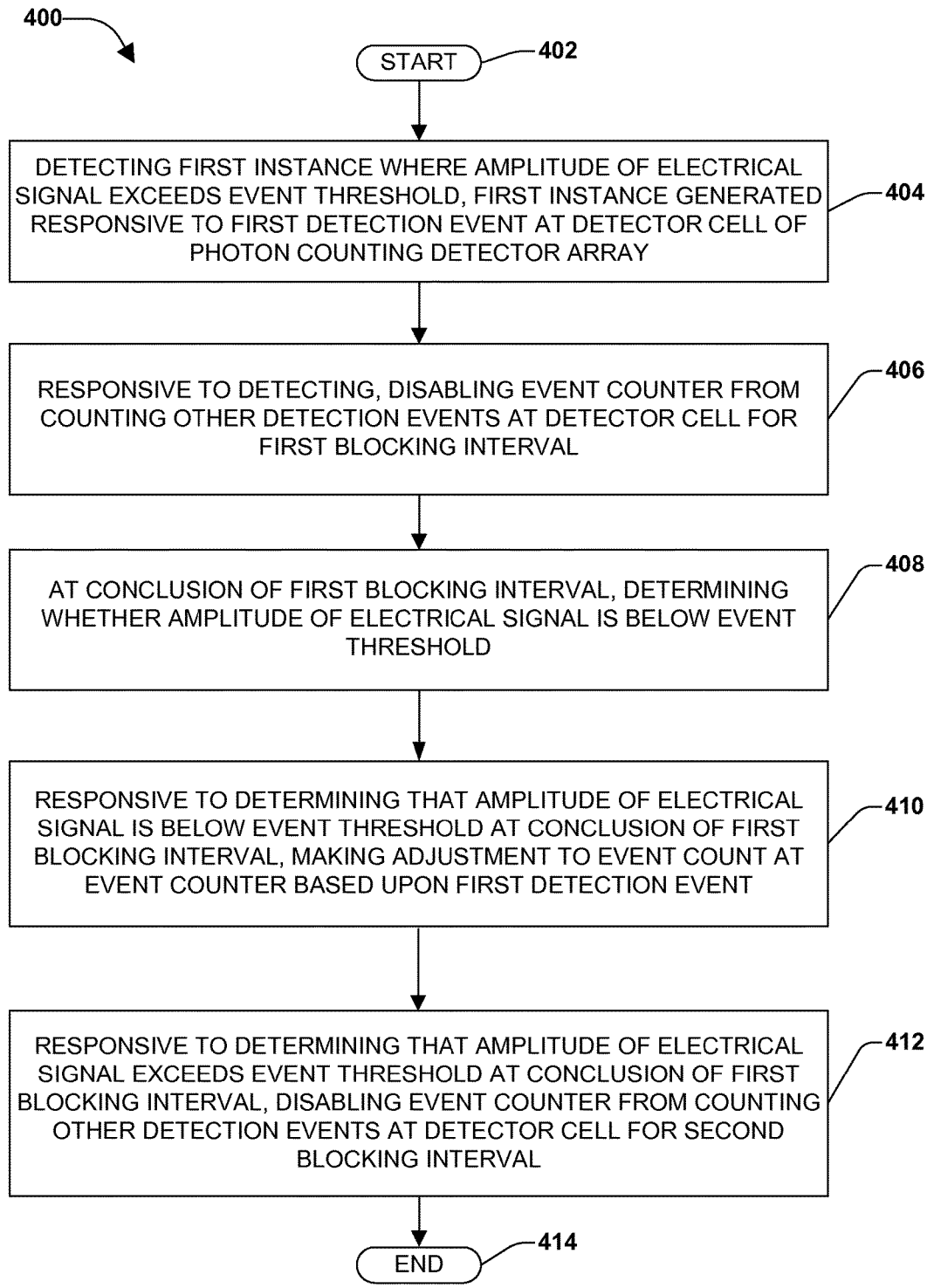
FIG. 4 is a flow diagram illustrating an example method for counting detection events via a photon counting detector array.

FIG. 4 illustrates an example method 400 for counting detection events via a photon counting detector array. The example method 400 begins at 402. At 404, a first instance where an amplitude of an electrical signal exceeds an event threshold is detected. The first instance of the electrical signal exceeding the event threshold is generated responsive to a first detection event at a detector cell of the photon counting detector array.

At 406, in the example method 400, responsive to the detecting, an event counter is disabled from counting other detection events at the detector cell for a first blocking interval. While the event counter 210 is disabled, detection events may still be detected. Though, since these detection events occur during the first blocking interval, the detection events may be ignored for the purposes of counting events.

At 408, in the example method 400, at a conclusion of the first blocking interval, a determination of whether the amplitude of the electrical signal is below the event threshold is made. At 410, in the example method 400, responsive to determining that the amplitude of the electrical signal is below the event threshold at the conclusion of the first blocking interval, the timing logic adjusts an event count at an event counter based upon the first detection event. In an example, the adjustment comprises incrementing/increasing the event counter and/or decrementing/decreasing the event counter 210.

At 412, in the example method 400, responsive to determining that the amplitude of the electrical signal exceeds the event threshold at the conclusion of the first blocking interval, the controller 206 is configured to disable the event counter from counting other detection events at the detector cell for a second blocking interval.

The method 400 ends at 414.

Figure 5:
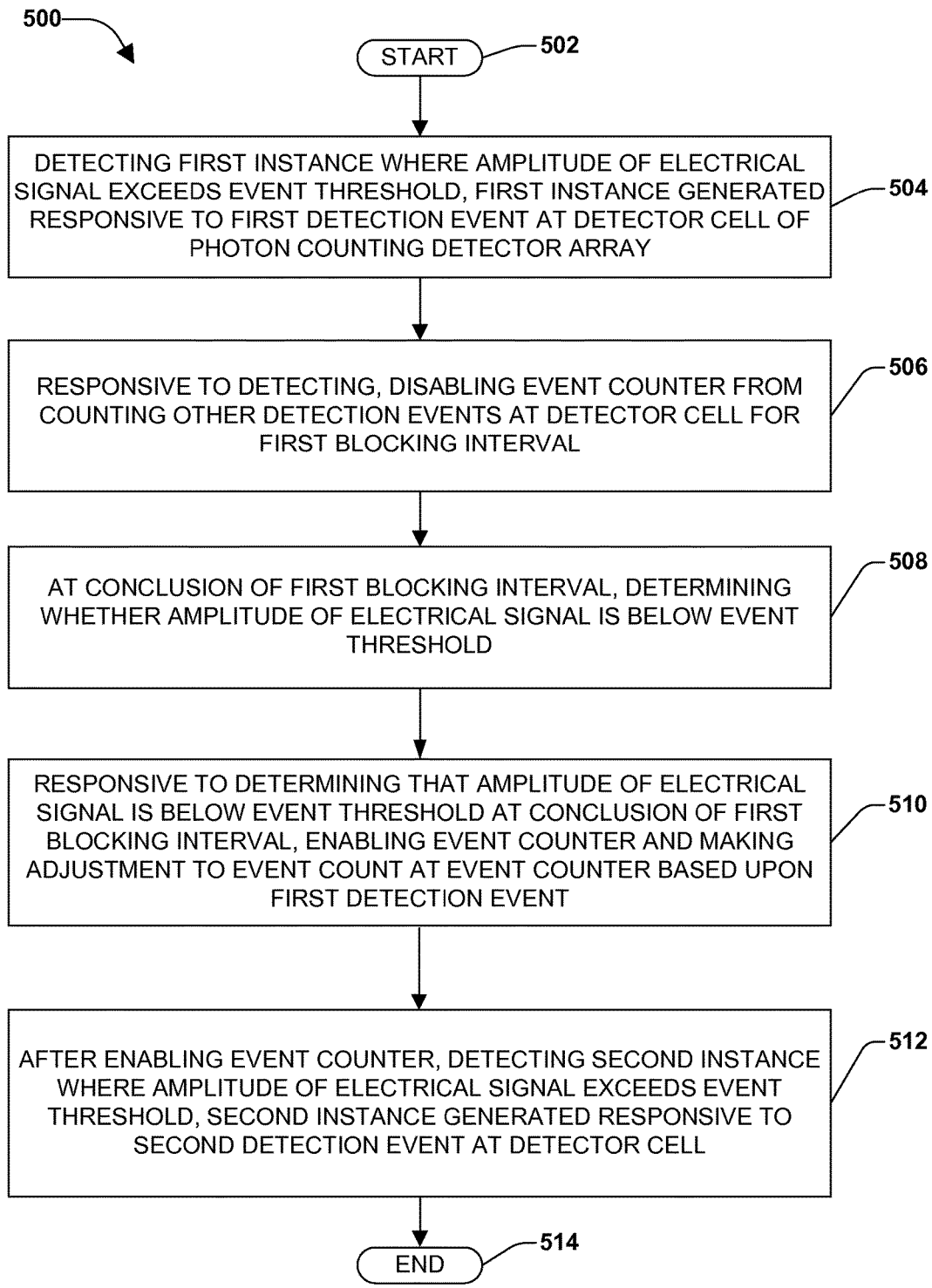
FIG. 5 is a flow diagram illustrating an example method for counting detection events via a photon counting detector array.

FIG. 5 illustrates an example method 500 for counting detection events via a photon counting detector array. The example method 500 begins at 502. At 504, a first instance where an amplitude of an electrical signal exceeds an event threshold is detected. The first instance of the electrical signal exceeding the event threshold is generated responsive to a first detection event at a detector cell of the photon counting detector array.

At 506, in the example method 500, responsive to the detecting, an event counter is disabled from counting other detection events at the detector cell for a first blocking interval. While the event counter 210 is disabled, detection events may still be detected (e.g., at 316 in FIG. 3). Though, since these detection events occur during the first blocking interval, the detection events may be ignored for the purposes of counting events.

At 508, in the example method 500, at a conclusion of the first blocking interval, a determination of whether the amplitude of the electrical signal is below the event threshold is made. At 510, in the example method 500, responsive to determining that the amplitude of the electrical signal is below the event threshold at the conclusion of the first blocking interval, the controller 206 enables an event counter and adjusts an event count at the event counter based upon the first detection event.

At 512, in the example method 500, after enabling the event counter, a second instance where the amplitude of the electrical signal exceeds the event threshold is detected. The second instance is generated responsive to a second detection event at the detector cell and the controller 206 is configured to disable the event counter 330 from detecting other detection events at the detector cell for the second blocking interval 314.

The method 500 ends at 514.

Figure 6:
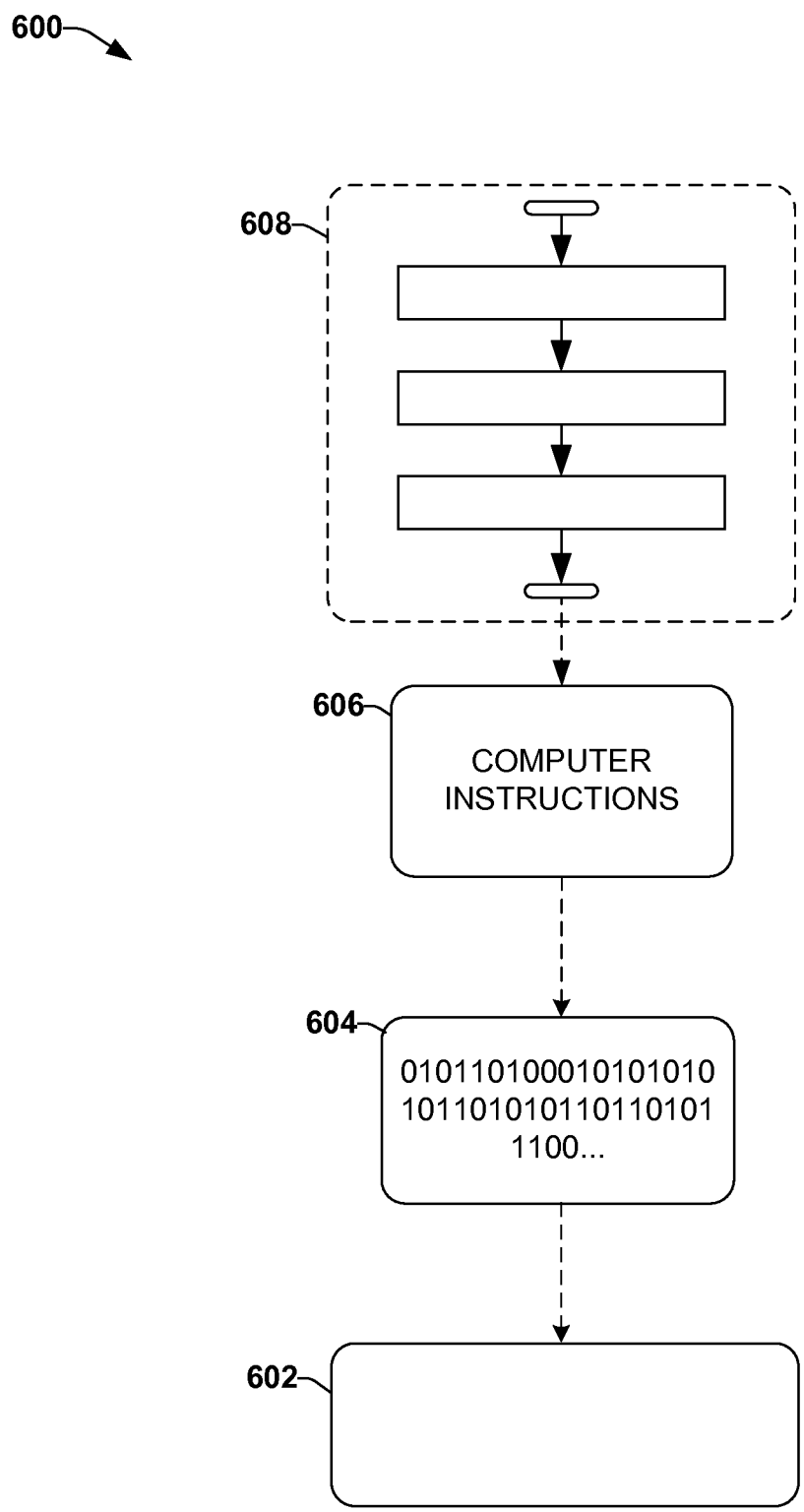
FIG. 6 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 6, wherein the implementation 600 comprises a computer-readable medium 602 (e.g., a flash drive, CD-R, DVD-R, application-specific integrated circuit (ASIC), field-programmable gate array (FPGA), a platter of a hard disk drive, etc.), on which is encoded computer-readable data 604. This computer-readable data 604 in turn comprises a set of processor-executable instructions 606 configured to operate according to one or more of the principles set forth herein. In one such embodiment 600, the processor-executable instructions 606 may be configured to perform a method 608 when executed via a processing unit, such as at least some of the example method 400 of FIG. 4 and/or example method 500 of FIG. 5. In another such embodiment, the processor-executable instructions 606 may be configured to implement a system, such as at least some of the example system 100 of FIG. 1 and/or at least some of the electronics arrangement 200 of FIG. 2. Many such computer-readable media may be devised by those of ordinary skill in the art that are configured to operate in accordance with one or more of the techniques presented herein.

Although the subject matter has been described in language specific to structural features or methodological acts, it is to be understood that the subject matter of the appended claims is not necessarily limited to the specific features or acts described above. Rather, the specific features and acts described above are disclosed as embodiment forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". The claimed subject matter may be implemented as a method, apparatus, or article of manufacture (e.g., as software, firmware, hardware, or any combination thereof).

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for counting detection events via a photon counting detector array, comprising:
   detecting a first instance where an amplitude of an electrical signal exceeds an event threshold, the first instance generated responsive to a first detection event at a detector cell of the photon counting detector array;
   responsive to the detecting, disabling an event counter from counting other detection events at the detector cell for a first blocking interval;
   at a conclusion of the first blocking interval, determining whether the amplitude of the electrical signal is below the event threshold;
   responsive to determining that the amplitude of the electrical signal is below the event threshold at the conclusion of the first blocking interval, making an adjustment to an event count at the event counter based upon the first detection event; and
responsive to determining that the amplitude of the electrical signal exceeds the event threshold at the conclusion of the first blocking interval:
making a first adjustment to a pileup count at a pileup counter; and
disabling the event counter from counting other detection events at the detector cell for a second blocking interval.

2. The method of claim 1, comprising, responsive to determining that the amplitude of the electrical signal is below the event threshold at the conclusion of the first blocking interval, enabling the event counter.

3. The method of claim 2, comprising, after enabling the event counter, detecting a second instance where the amplitude of the electrical signal exceeds the event threshold, the second instance generated responsive to a second detection event at the detector cell.

4. The method of claim 1, comprising, at a conclusion of the second blocking interval, determining whether the amplitude of the electrical signal is below the event threshold.

5. The method of claim 4, comprising, responsive to determining that the amplitude of the electrical signal is below the event threshold at the conclusion of the second blocking interval, making a second adjustment to the pileup count at the pileup counter.

6. The method of claim 1, comprising determining a ratio between a possible number of pileup events during a view and a number of adjustments to the pileup counter during the view.

7. The method of claim 6, comprising applying a correction to an event count of the event counter based upon the ratio to generate a total count at the detector cell during the view.

8. The method of claim 1, the first blocking interval selected based upon a physical structure of the detector cell.

9. The method of claim 1, comprising, responsive to determining that the amplitude of the electrical signal is below the event threshold at the conclusion of the first blocking interval, determining whether the amplitude of the electrical signal remains below the event threshold for a first interval.

10. The method of claim 9, comprising, responsive to determining that the amplitude of the electrical signal remains below the event threshold for the first interval, enabling the event counter.

11. The method of claim 9, comprising, responsive to determining that the amplitude of the electrical signal exceeds the event threshold during the first interval, disabling the event counter from counting other detection events at the detector cell for the second blocking interval.

12. A method for counting detection events via a photon counting detector array, comprising
detecting a first instance where an amplitude of an electrical signal exceeds an event threshold, the first instance generated responsive to a first detection event at a detector cell of the photon counting detector array;
responsive to the detecting, disabling an event counter from counting other detection events at the detector cell for a first blocking interval;
at a conclusion of the first blocking interval, determining whether the amplitude of the electrical signal is below the event threshold;
responsive to determining that the amplitude of the electrical signal is below the event threshold at the conclusion of the first blocking interval:
determining whether the amplitude of the electrical signal remains below the event threshold for a first interval; and
responsive to determining that the amplitude of the electrical signal remains below the event threshold for the first interval enabling the event counter, and making an adjustment to an event count at the event counter based upon the first detection event; and
after enabling the event counter, detecting a second instance where the amplitude of the electrical signal exceeds the event threshold, the second instance generated responsive to a second detection event at the detector cell.

13. The method of claim 12, comprising, responsive to determining that the amplitude of the electrical signal exceeds the event threshold at the conclusion of the first blocking interval, making a first adjustment to a pileup count at a pileup counter.

14. The method of claim 13, comprising determining a ratio between a possible number of pileup events during a view and a number of adjustments to the pileup counter during the view.

15. The method of claim 14, comprising applying a correction to an event count of the event counter based upon the ratio to generate a total count at the detector cell during the view.

16. The method of claim 15, the first blocking interval selected based upon a physical structure of the detector cell.

17. A method for counting detection events via a photon counting detector array, comprising:
detecting a first instance where an amplitude of an electrical signal exceeds an event threshold, the first instance generated responsive to a first detection event at a detector cell of the photon counting detector array;
responsive to the detecting, disabling an event counter from counting other detection events at the detector cell for a first blocking interval;
at a conclusion of the first blocking interval, determining whether the amplitude of the electrical signal is below the event threshold;
responsive to determining that the amplitude of the electrical signal is below the event threshold at the conclusion of the first blocking interval:
making an adjustment to an event count at the event counter based upon the first detection event,
determining whether the amplitude of the electrical signal remains below the event threshold for a first interval, and
responsive to determining that the amplitude of the electrical signal exceeds the event threshold during the first interval, disabling the event counter from counting other detection events at the detector cell for a second blocking interval; and
responsive to determining that the amplitude of the electrical signal exceeds the event threshold at the conclusion of the first blocking interval, disabling the event counter from counting other detection events at the detector cell for the second blocking interval.

18. The method of claim 17, comprising, responsive to determining that the amplitude of the electrical signal exceeds the event threshold at the conclusion of the first blocking interval, making a first adjustment to a pileup count at a pileup counter.

19. The method of claim 18, comprising:
at a conclusion of the second blocking interval, determining whether the amplitude of the electrical signal is below the event threshold; and
responsive to determining that the amplitude of the electrical signal is below the event threshold at the conclusion of the second blocking interval, making a second adjustment to the pileup count at the pileup counter.

20. The method of claim 17, comprising, responsive to determining that the amplitude of the electrical signal remains below the event threshold for the first interval, enabling the event counter.

\* \* \* \* \*